United States Patent
Ryan

(10) Patent No.: US 12,446,485 B2
(45) Date of Patent: Oct. 21, 2025

(54) CLOSING WHEEL SYSTEM FOR A SEEDER UNIT

(71) Applicant: RYAN NT INTERNATIONAL PTY LTD, Horsham (AU)

(72) Inventor: Paul Ryan, Horsham (AU)

(73) Assignee: RYAN NT INTERNATIONAL PTY LTD, Horsham (AU)

( * ) Notice: Subject to any disclaimer, the term of this patent is extended or adjusted under 35 U.S.C. 154(b) by 490 days.

(21) Appl. No.: 18/081,600

(22) Filed: Dec. 14, 2022

(65) Prior Publication Data

US 2023/0180652 A1    Jun. 15, 2023

(30) Foreign Application Priority Data

Dec. 15, 2021 (AU) .................................. 2021286349

(51) Int. Cl.
*A01C 5/06* (2006.01)
*A01B 29/04* (2006.01)

(52) U.S. Cl.
CPC ............ *A01C 5/068* (2013.01); *A01B 29/046* (2013.01); *A01C 5/066* (2013.01)

(58) Field of Classification Search
CPC ....... A01C 5/066; A01C 5/068; A01B 29/046; A01B 9/003; B60B 9/08; B60B 19/00; B60B 2900/211

See application file for complete search history.

(56) References Cited

U.S. PATENT DOCUMENTS

| | | | | |
|---|---|---|---|---|
| 994,411 | A | * | 6/1911 | Kovar ...................... A01C 5/06 111/193 |
| 1,865,457 | A | * | 7/1932 | Cruz .......................... B60C 7/20 267/167 |
| 1,878,142 | A | * | 9/1932 | Hjermstad ............. A01B 35/16 172/549 |
| 3,418,960 | A | * | 12/1968 | Nelson .................. B60F 3/0023 301/41.1 |
| 10,455,752 | B2 | * | 10/2019 | Ryan ...................... A01B 29/04 |
| 11,516,960 | B2 | * | 12/2022 | Ryan ...................... A01B 63/111 |
| 12,167,705 | B2 | * | 12/2024 | Ryan ...................... A01C 5/068 |

FOREIGN PATENT DOCUMENTS

WO    WO-0176351 A1 * 10/2001    ........... A01B 29/046

* cited by examiner

*Primary Examiner* — Alicia Torres
(74) *Attorney, Agent, or Firm* — Bochner PLLC; Andrew Bochner

(57) ABSTRACT

A closing wheel system for a seeder unit comprising a pair of closing wheels, each closing wheel comprising a coil member having a first end and a second end and a plurality of coil windings extending therebetween. The system comprising a base plate having a first surface and a second surface to which the second end of the coil member may extend around a periphery of the base plate. The system comprising an axle member extending through the base plate and having a free end extending from the base plate for engagement with the support arm, and a pair of wedge washer members mounted on the free end. The wedge washer members may engage with the support arm such that the wedge washers members engage with the support arm such that the axle member is caused to extend downward to orientate the closing wheels with respect to the support arm.

6 Claims, 7 Drawing Sheets

CLOSING WHEEL SYSTEM FOR A SEEDER UNIT

CROSS-REFERENCE TO RELATED APPLICATIONS

This application claims priority to Australian Patent Application No. 2021286349, filed on Dec. 15, 2021. The contents of which are incorporated herein by reference.

FIELD OF INVENTION

The present invention relates generally to agricultural equipment, and in particular, to a closing wheel system for use with an agricultural seeder unit for closing a seed trench after seeding.

BACKGROUND OF THE INVENTION

A seeder unit, or seed drill, is an agricultural device used in crop farming applications to deposit seeds into a ground surface to a desired depth. The seeder unit is typically towed, or otherwise driven, by a vehicle, such as a tractor, and has a hopper that is filled with seeds that are delivered into a furrow created by a furrow opener, such as a disc. Most seeder units employ some form of a closing wheel that is provided behind the furrow opener to close the furrow after the seed has been delivered to ensure desired soil coverage of the seeds.

The effectiveness of the closing wheel will be largely dependent upon the type of farming application that the seeder unit is operating within. In full tillage applications, the soil has been tilled prior to seeding to minimise the presence of residue from prior crops or from the presence of hard soils. In such applications, a conventional closing wheel made from rubber or the like is able to work effectively to close the furrow as the tilled ground surface will be relatively smooth to enable such a conventional wheel to function as desired. However, in no-till cropping applications, the ground surface into which the seeds are to be deposited typically has heavy crop residue and has not been prepared which may cause a conventional rubber closing wheel to bounce and fail to adequately close the furrow and cover the seeds. This can have a considerable detrimental effect on the crop and the ability of the seeds to germinate and grow to an optimal level.

A variety of different closing wheel applications have been developed to address this problem and to ensure adequate closing of the furrow after seeding. One such proposal has been to employ spiked closing wheels to replace traditional rubber wheels. The spiked closing wheels are able to penetrate the soil and crop residue thereby breaking up the soil in the process and avoiding bouncing of the closing wheel. However, such wheels have also been found to penetrate too deeply into the soil surface, especially in softer soil conditions, resulting in the seeds becoming displaced and requiring the operator to replace the spiked wheels during use. As a result, air pockets can be formed about the seeds and trench cracking can occur, which can result in uneven germination and inconsistent crop growth.

Thus, there is a need to provide an improved closing wheel system that can be used with existing seeder units and which can function effectively over a variety of different soil conditions to produce good soil coverage of the seeds and prevent trench cracking and other such detrimental effects.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

STATEMENT OF INVENTION

The invention according to one or more aspects is as defined in the independent claims. Some optional and/or preferred features of the invention are defined in the dependent claims.

Accordingly, in one aspect of the invention there is provided a closing wheel system for a seeder unit comprising:
   a pair of a closing wheels, each closing wheel mounted to an opposing side of a support arm of a seeder unit, each closing wheel comprising:
      a coil member having a first end and a second end and a plurality of coil windings extending between the first and second ends;
      a base plate having a first surface to which the first end of the coil member is connected and a second surface to which the second end of the coil member such that the windings of the coil member extend around a periphery of the base plate;
      an axle member extending through the base plate and having a free end extending from the base plate for engagement with the support arm of the seeder unit; and
      a pair of wedge washer members mounted on the free end of the axle member;
   wherein the pair of wedge washer members are configured to engage with the opposing sides of the support arm of the seeder unit such that when the closing wheel is secured to the side of the support arm of the seeder unit, the wedge washers members engage with the support arm such that the axle member is caused to extend in a downward angle with respect to a horizontal axis to angularly orientate the closing wheels with respect to the support arm of the seeder unit.

In one embodiment, the support arm of seeder unit has a hollow body defining an external surface and an internal surface separated by a wall and wherein a recess is formed in the wall of the support arm to receive the axle member. The pair of wedge washer members may engage about the wall of the hollow body of the support arm such that one of the wedge washer members contacts an external surface of the support arm and the other wedge washer member contacts the internal surface of the support arm. A nut may be provided on the free end of the axle member to tighten against the wedge washer members to facilitate engagement of the wedge washer members about the wall of the support arm.

The base plate of the closing wheel may be variably spaced from the side of the support arm of the seeder unit. The base plate of the closing wheel may be variable spaced from the side of the support arm by one or more disc washers mounted on the axle member between the base plate and the wedge washer member.

BRIEF DESCRIPTION OF THE DRAWINGS

The invention may be better understood from the following non-limiting description of preferred embodiments, in which.

DETAILED DESCRIPTION OF THE DRAWINGS

Preferred features of the present invention will now be described with particular reference to the accompanying drawings. However, it is to be understood that the features illustrated in and described with reference to the drawings are not to be construed as limiting on the scope of the invention.

The present invention will be described below in relation to a closing wheel system for use with a seeder device. However, it will be appreciated that the closing wheel system of the present invention could be used with a variety of different types of seeding devices, as will be appreciated by those skilled in the art.

A variety of seeder devices exist for planting and seeding crops. A seeder device is generally configured to comprise a frame that is attached to a vehicle, such as a tractor by way of a conventional link. The seeder device is then able to be towed, or otherwise conveyed, under action of a tractor or similar vehicle, to facilitate planting of seeds in a ground surface that may be tilled or not, depending upon the farming practices being practiced by the farmer.

The seeder device typically comprises a disc member in association with a gauge wheel, both of which are rotatably mounted on a common shaft. Under action of the vehicle, the disc member and gauge wheel rotate together such that the disc member cuts into the ground surface to create a furrow in the soil as the seeder device moves across the ground surface. The depth of the furrow is controlled by the gauge wheel that travels beside the disc member and over the surface of the soil along a side of the furrow. The gauge wheel may came in a variety of different forms and may be a rubber wheel or a cast wheel or may be in the form of a coil wheel system.

A planting tube is located behind the disc member to deposit seeds into the furrow created by the disc member. The planting tube is typically in connection with a hopper, or similar seed storage facility to store the seeds for planting and to deliver the seeds to the planting tube at regular intervals.

To close the furrow after the seed has been delivered thereto, a closing wheel system is typically provided to travel behind the planting tube. The closing wheel system is typically mounted to a support arm that is configured to position the closing wheel in substantially the same vertical plane as the disc member such that as the closing wheel travels behind the disc member it rotates over the ground surface to close the furrow and cover the planted seed with soil, as will be described in more detail below.

Figure 4:
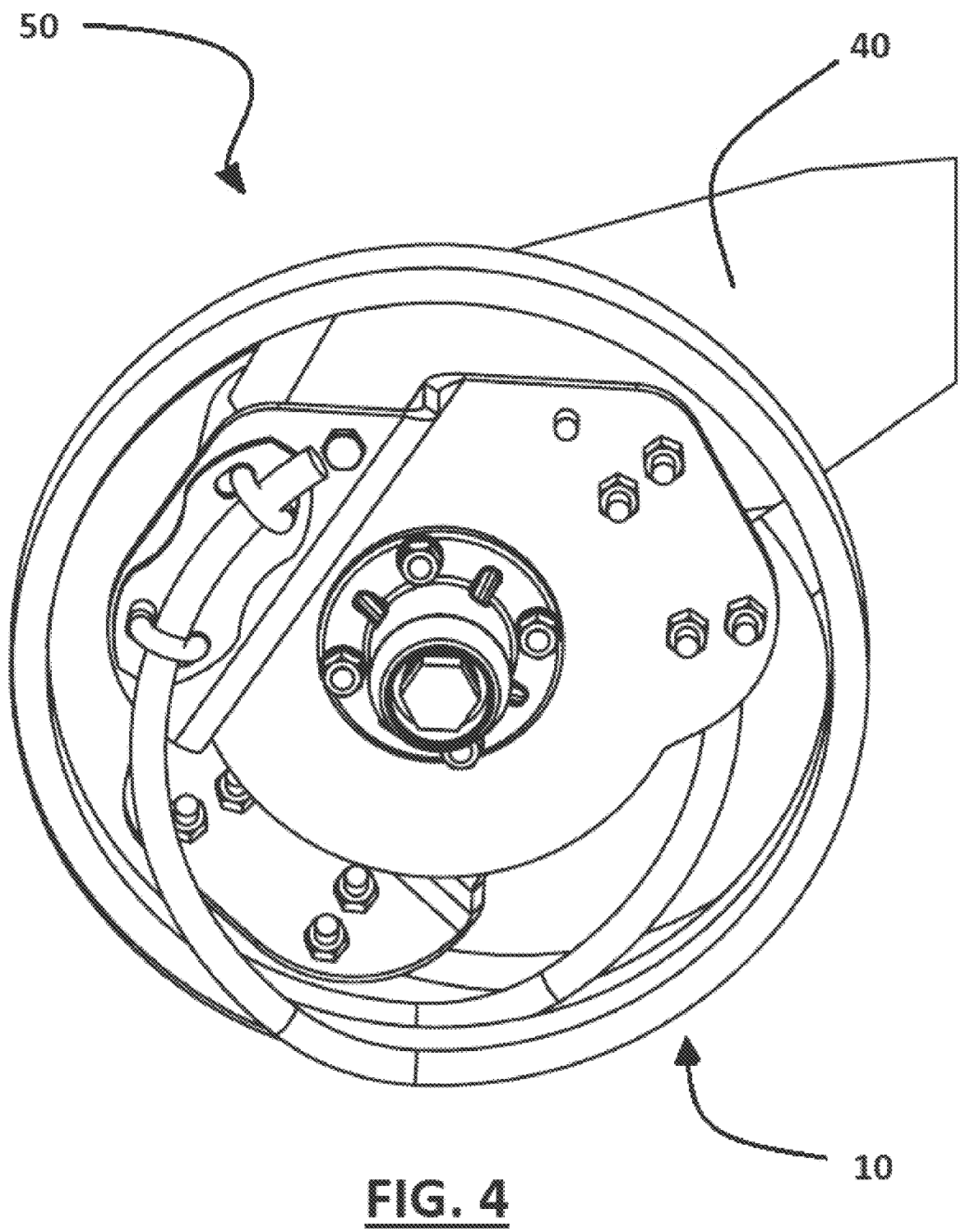
FIG. 4 is a side perspective view of a closing wheel system of the present invention attached to an arm of a seeder unit.
Figure 5:
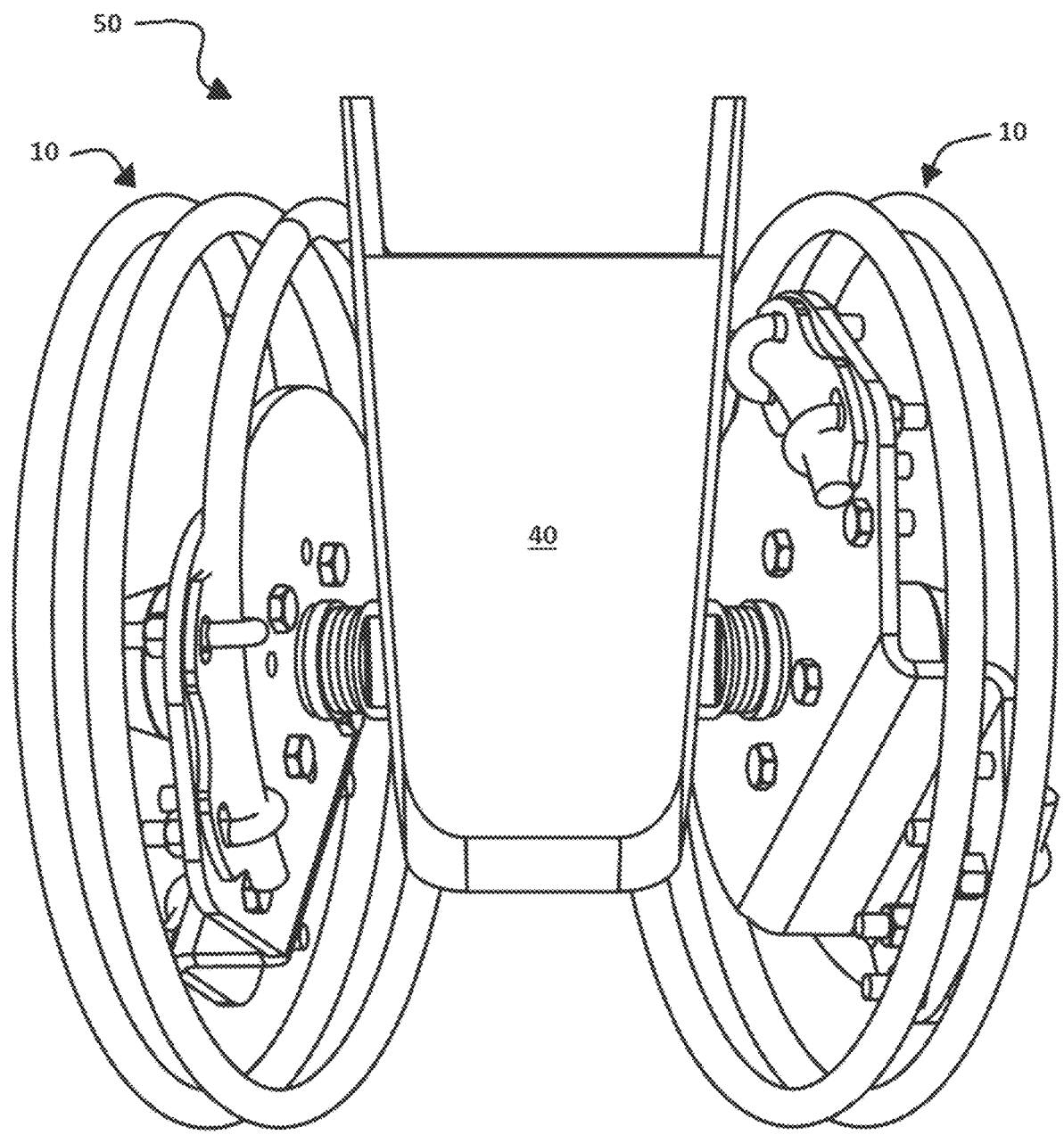
FIG. 5 is a rear view of the closing wheel system of FIG. 4.

A closing wheel system 50 in accordance with a preferred embodiment of the present invention is depicted in FIG. 4 and FIG. 5. The closing wheel system 50 comprises a pair of closing wheels 10 mounted to opposing sides of an arm 40 of a seeder device. The closing wheel system 50 is configured to travel behind a planting tube of a seeder unit to close the farrow created by the disc member in a manner as will be described in more detail below.

Figure 1:
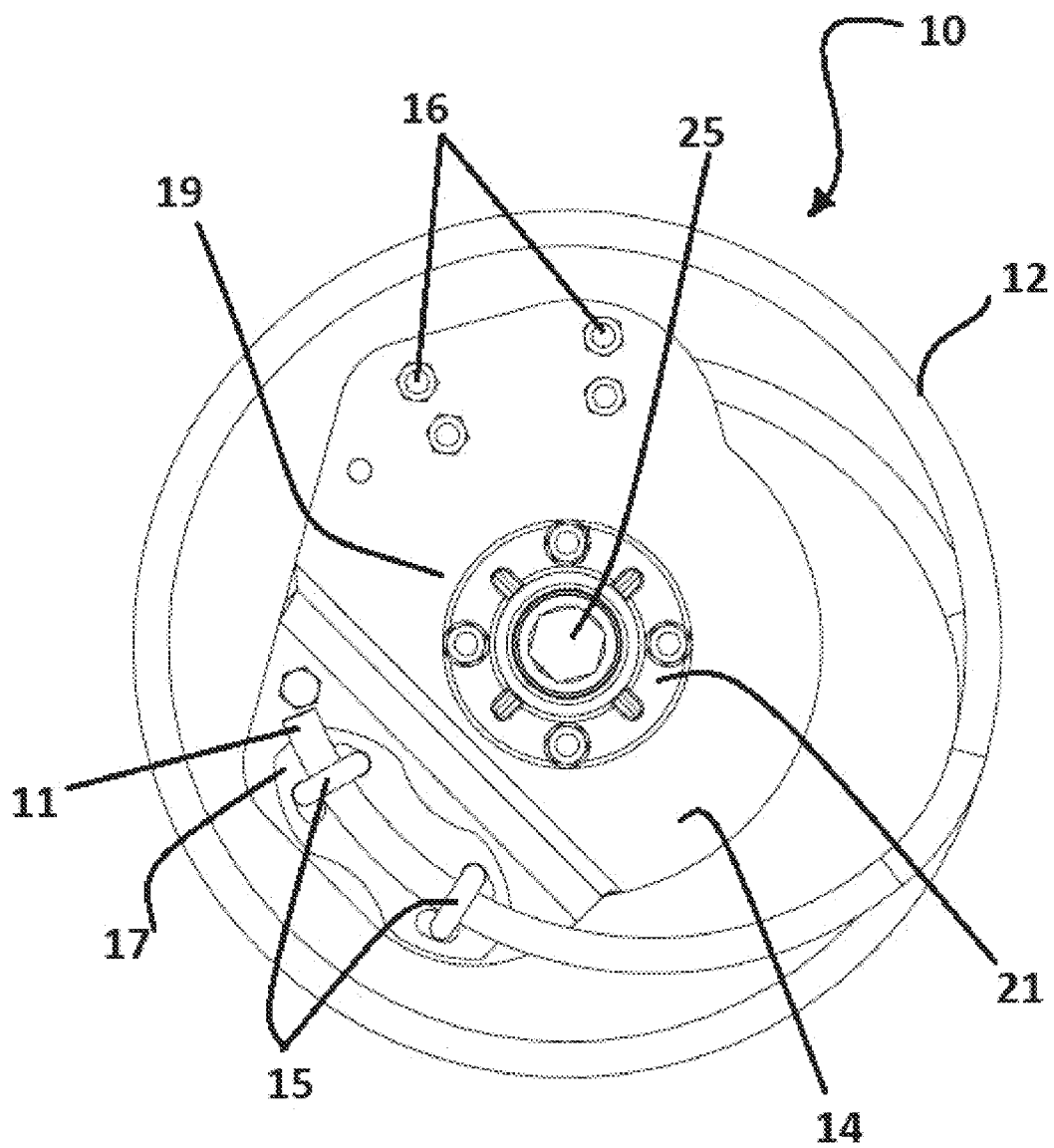
FIG. 1 is a side view of closing wheel in accordance with an embodiment of the present invention.
Figure 2:
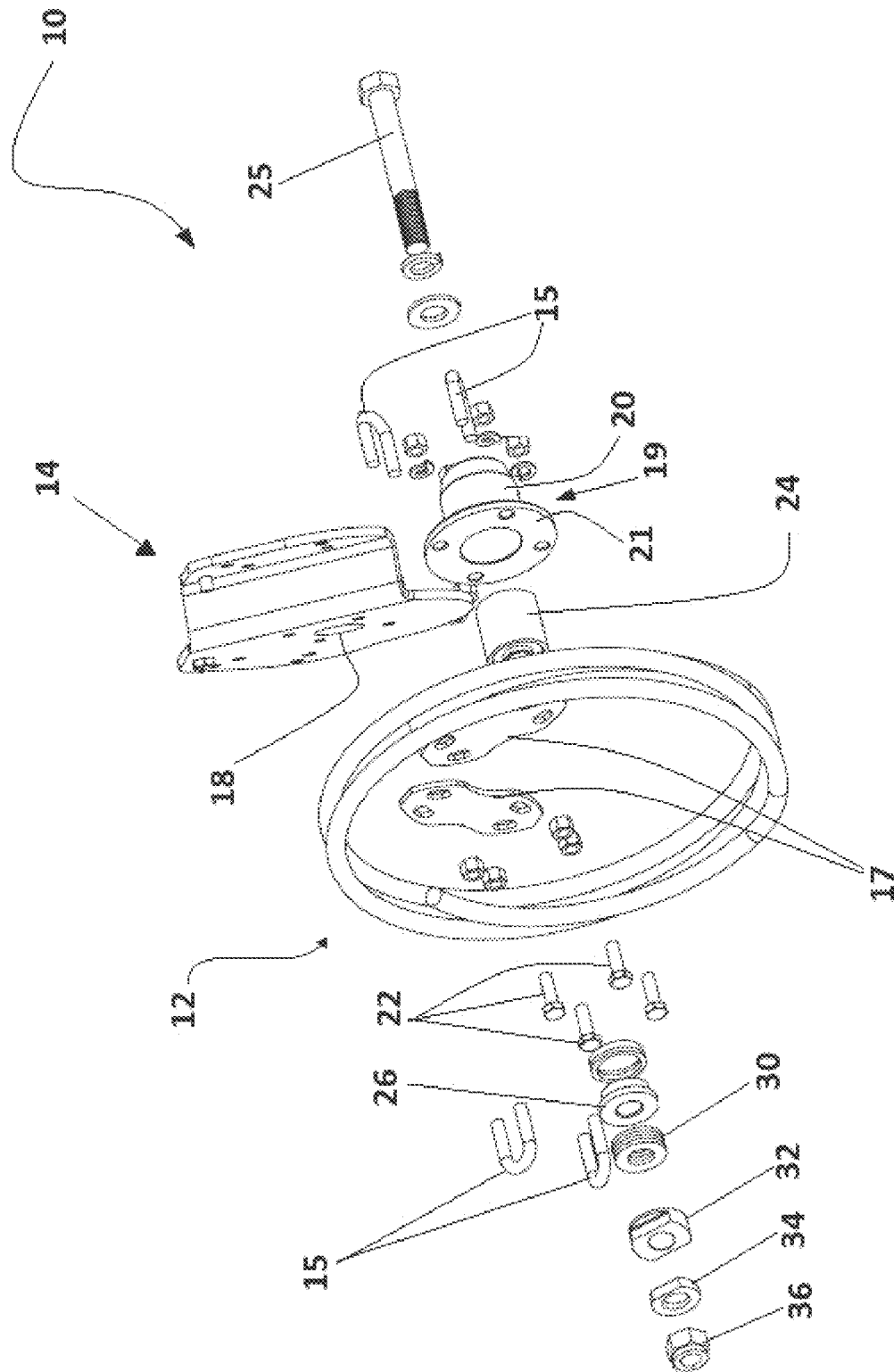
FIG. 2 is an exploded view of the closing wheel of FIG. 1.
Figure 3:
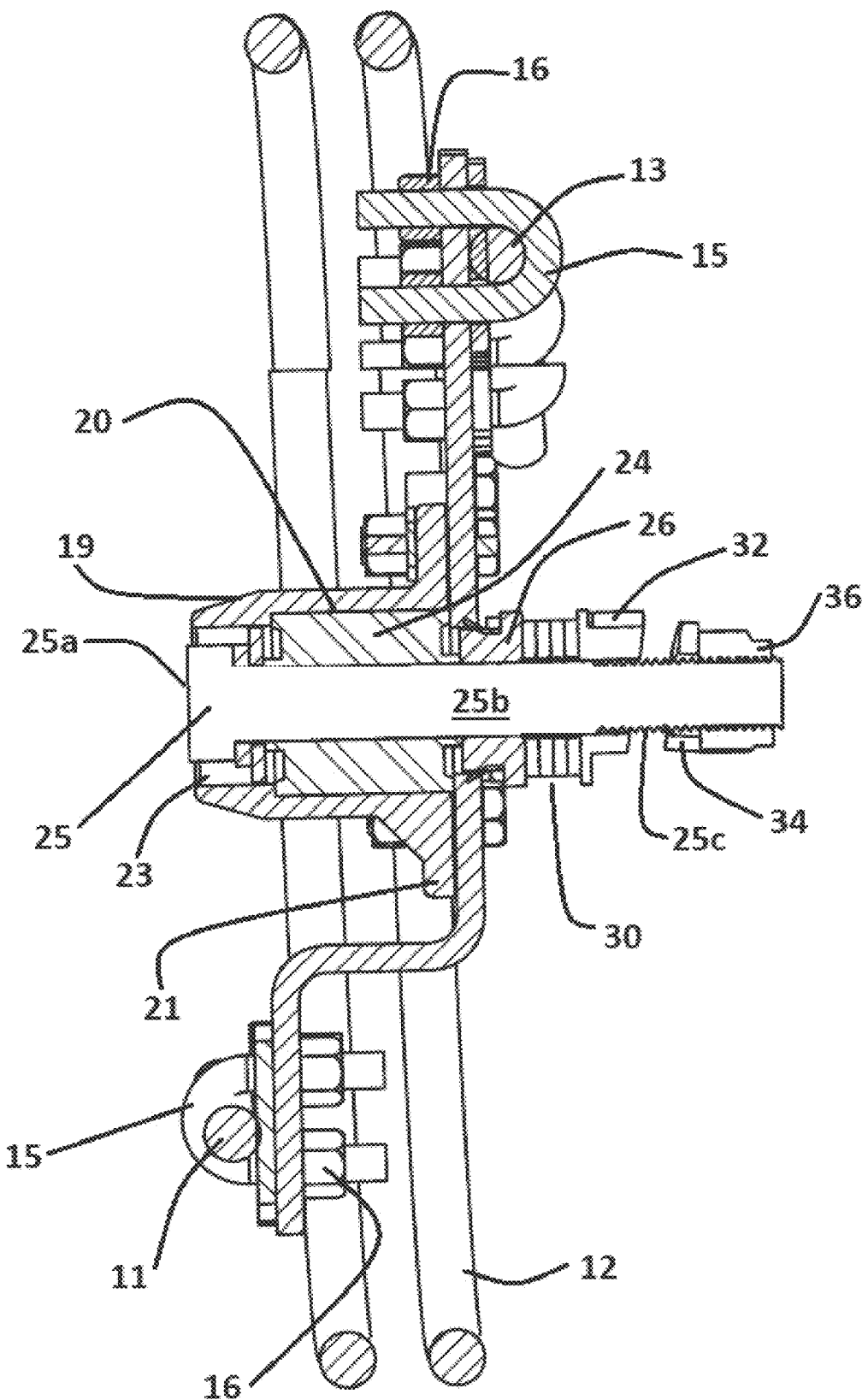
FIG. 3 is a cross-sectional end view of the closing wheel of FIG. 1.

Referring to FIGS. 1-3, a closing wheel 10 of the closing wheel system 50 is depicted, in accordance with an embodiment of the present invention.

The closing wheel 10 generally comprises a helical coil 12 made from a spring steel or similar material. The helical coil 12 is wound in at least two windings to provide a substantially circular form so as to function as a wheel capable of rotating over a soil surface.

The coil 12 is mounted about a central base plate 14 with one end 11 of the coil 12 mounted to one surface of the base plate 14 and the other end 13 of the coil 12 mounted to an opposing surface of the base plate 14. Each of the ends 11, 13 of the coil 12 are attached to the base plate 14 by way of U-bolts 15 that fit around the ends 11, 13 of the coil 12 and are secured in position by nuts 16. A wear plate 17 is provided to extend between the ends 11, 13 of the coil 12 and the surface of the base plate 14, to accommodate any friction or wearing which may result as the coil 12 flexes under use.

The base plate 14 has a central recess 18 formed therein to facilitate mounting of the closing wheel system 10 to an arm 40 of the seeder unit. A hub member 19 is provided to fit over the recess 18 on an outer side of the base plate 14. The hub member 19 has a tubular body portion 20 having a flange 21 extending about an end thereof. The hub member 19 is mounted to the outer surface of the base plate 14 via bolts 22 such that the tubular body portion 20 projects from the surface of the base plate 14 to define a narrow central recess 23, as is shown more clearly in FIG. 3.

A bearing member 24 is mounted within the tubular body portion 20 of the hub member 19 to facilitate rotational movement of the base plate about a central bolt member 25, which functions as an axle about which the closing wheel 10 can rotate. The bolt member 25 has a head portion 25a that is received within the central recess 23 of the hub member 19. The bolt member 25 has an elongate body 25b that passes through a bushing 29 located on the opposing side of the base plate so as to project from the base plate 14 to facilitate engagement with the mounting or support arm of the seeder unit. The distal end of the bolt member 25 has a threaded outer surface 25c that facilitates such engagement with the seeder unit.

Figure 6:
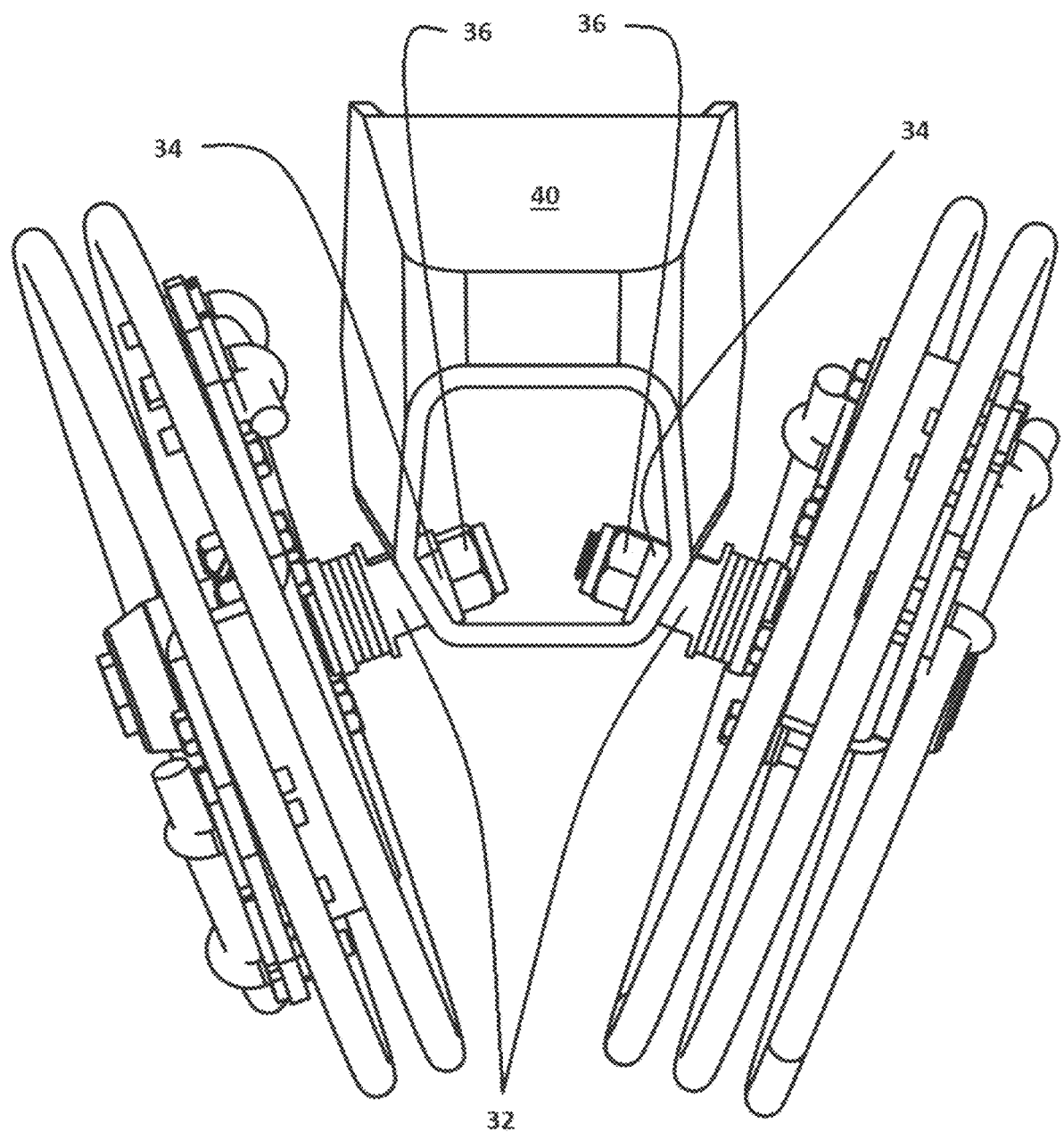
FIG. 6 is a front view of the closing wheel system of FIG. 4.
Figure 7:
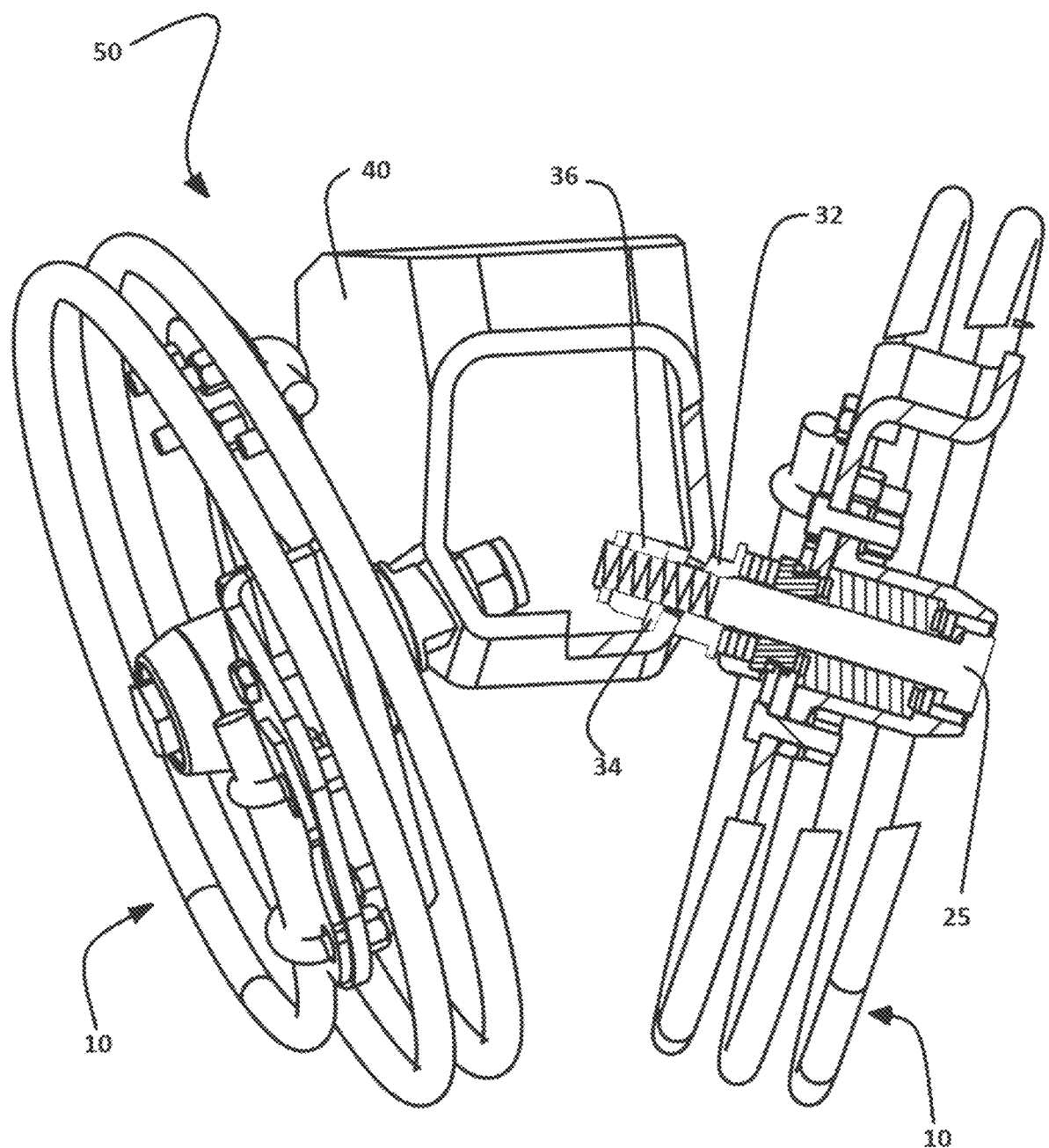
FIG. 7 is a partial cut-away view of the closing wheel system of FIG. 6.

As is shown more clearly in FIG. 3, FIG. 6 and FIG. 7, the manner in which the closing wheel 10 is mounted to the arm 40 of a seeder unit is shown. As is best shown in FIG. 6 and FIG. 7, the arm 40 of the seeder unit is in the form of a substantially hollow body having thin walls through which the closing wheels 10 are mounted to opposing sides thereof.

A pair of wedged washers 32, 34 are provided on the distal end of the bolt member 25 to abut opposing sides of the walls of the arm 40 of the seeder unit. The surfaces of the wedged washers 32, 34 that abut the opposing sides of the walls of the arm member 40 are angled such that as they are tightened about the walls of the arm 40, the closing wheel 10 extends at an angle to the horizontal axis, as shown. In this regard, the angled surfaces of the wedged washers 32, 34 sandwich the angled wall of the arm member 40 therebetween such they can be tightened about the wall of the arm member as shown. In the embodiment as depicted, the surfaces of the wedged washers 32, 34 have an angle of 10° to the vertical, although other angles are also envisaged.

To mount the closing wheels 10 to opposing sides of the arm of the seeder unit, a nut 36 is mounted on the distal end of the bolt member 25. The nut 36 has an internal thread that engages with the external thread provided on the bolt member 25 such that as the nut 36 is tightened against the walls of the arm 40, the wedged washers 32, 34 act against the wall of the arm 40 from opposing sides thereof. As is shown more clearly in FIG. 7, the recess formed through the wall of the arm 40 is slightly oversized with respect to the diameter of the bolt member 25, to provide a degree of angular variation. Thus, by tightening the nut 36 onto the end of the bolt member 25 due to the angular surfaces of the wedged washers 32, 34 acting against the inner and outer surfaces of the wall of the arm 40, the closing wheels 10 are securely retained at an angle with respect to the horizontal axis. It will be appreciated that the walls of the arm 40 to which the closing wheels 10 are mounted By providing such an angular orientation of the opposing closing wheels 10 with respect to the arm of the seeder unit, the coil 12 travelling over the soil behind the disc member performs an auger action that contacts the soil and closes the furrow in a more concentrated manner. This ensures better soil coverage of the seed and retains moisture about the seed, thus reducing the likelihood of trench cracking.

The system for attaching the closing wheel system of the present invention is also able to adjust the aggression of the closing wheel system, in respect to the degree of extension of the closing wheels 10 from the arm 40 of the seeder unit. This is achieved through the use of disc washers 30 that are located between the wedged washer 32 and the bushing 26. By adjusting the number of disc washers 30 employed between the bushing 26 and the wedge washer 32, the extent of projection of the closing wheels 10 from the arm of the seeder unit can be adjusted to satisfy the soil requirements of the planting environment. To increase the aggression of the closing wheel system a large number of disc washers may be employed and to minimise aggression, lesser disc washers may be employed.

It will be appreciated in conventional rubber, spiked, or cast closing wheel systems, poor germination due to poor seed to soil contact or trench cracking can result. In the present closing wheel system, the auger action of the opposing coils compacts soil tightly and screws the furrow closed for a better press. Further to this, the coils function to shift an excellent tilth across the soil surface, resulting in the furrow retaining moisture and avoiding cracking. The closing wheel system of the present invention offers an easily adjustable system for single disc opener seeders where the angle or aggression of the wheel can be simply varied as required, enhancing the ability of the closing wheel system to close the furrow based on various soil types and conditions.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

Orientational terms used in the specification and claims such as vertical, horizontal, top, bottom, upper and lower are to be interpreted as relational and are based on the premise that the component, item, article, apparatus, device or instrument will usually be considered in a particular orientation, typically with the closing wheel system uppermost.

It will be appreciated by those skilled in the art that many modifications and variations may be made to the methods of the invention described herein without departing from the spirit and scope of the invention.

The invention claimed is:

1. A closing wheel system for a seeder unit comprising:
a pair of a closing wheels, each closing wheel mounted to an opposing side of a support arm of a seeder unit, each closing wheel comprising:
a coil member having a first end and a second end and a plurality of coil windings extending between the first and second ends;
a base plate having a first surface to which the first end of the coil member is connected and a second surface to which the second end of the coil member is connected such that the windings of the coil member extend around a periphery of the base plate;
an axle member extending through the base plate and having a free end extending from the base plate for engagement with the support arm of the seeder unit; and
a pair of wedge washer members mounted on the free end of the axle member;
wherein the pair of wedge washer members are configured to engage with the opposing sides of the support arm of the seeder unit such that when the closing wheel is secured to the side of the support arm of the seeder unit, the wedge washer members engage with the support arm such that the axle member is caused to extend in a downward angle with respect to a horizontal axis to angularly orientate the closing wheels with respect to the support arm of the seeder unit.

2. A closing wheel system according to claim 1, wherein the support arm of the seeder unit has a hollow body defining an external surface and an internal surface separated by a wall and wherein a recess is formed in the wall of the support arm to receive the axle member.

3. A closing wheel system according to claim 2, wherein the pair of wedge washer members engage about the wall of the hollow body of the support arm such that one of the wedge washer members contacts an external surface of the support arm and the other wedge washer member contacts the internal surface of the support arm.

4. A closing wheel system according to claim 3, wherein a nut is provided on the free end of the axle member to tighten against the wedge washer members to facilitate engagement of the wedge washer members about the wall of the support arm.

5. A closing wheel system according to claim 1, wherein the base plate of the closing wheel is variably spaced from the side of the support arm of the seeder unit.

6. A closing wheel system according to claim 5, wherein the base plate of the closing wheel is variably spaced from the side of the support arm by one or more disc washers mounted on the axle member between the base plate and the wedge washer member.

* * * * *